United States Patent
Schaefer

(10) Patent No.: US 9,451,338 B2
(45) Date of Patent: Sep. 20, 2016

(54) LINE CARD WITH NETWORK PROCESSING DEVICE AND DATA PUMP DEVICE

(75) Inventor: Franz Josef Schaefer, Oberhaching (DE)

(73) Assignee: Lantiq Beteiligungs-GmbH & Co. KG, Neubiberg (DE)

(*) Notice: Subject to any disclaimer, the term of this patent is extended or adjusted under 35 U.S.C. 154(b) by 571 days.

(21) Appl. No.: 11/580,685

(22) Filed: Oct. 13, 2006

(65) Prior Publication Data

US 2008/0089337 A1    Apr. 17, 2008

(51) Int. Cl.
*H04Q 1/02*    (2006.01)
*H04L 12/701*    (2013.01)

(52) U.S. Cl.
CPC .............. *H04Q 1/028* (2013.01); *H04L 45/00* (2013.01); *H04Q 1/15* (2013.01)

(58) Field of Classification Search
None
See application file for complete search history.

(56) References Cited

U.S. PATENT DOCUMENTS

| | | | |
|---|---|---|---|
| 5,696,911 A * | 12/1997 | Fredriksson | 710/106 |
| 6,385,208 B1 | 5/2002 | Findlater et al. | |
| 6,680,940 B1 * | 1/2004 | Lewin et al. | 370/389 |
| 6,798,744 B1 * | 9/2004 | Loewen et al. | 370/235 |
| 7,023,856 B1 * | 4/2006 | Washabaugh et al. | 370/395.1 |
| 7,295,566 B1 * | 11/2007 | Chiu et al. | 370/419 |
| 7,433,365 B1 * | 10/2008 | Burch et al. | 370/437 |
| 2001/0033575 A1 * | 10/2001 | Shimamura et al. | 370/419 |
| 2002/0083233 A1 * | 6/2002 | Owen et al. | 710/60 |
| 2006/0140206 A1 * | 6/2006 | Kataria et al. | 370/419 |
| 2008/0126607 A1 * | 5/2008 | Carr et al. | 710/29 |

OTHER PUBLICATIONS

POS-PHY™. "Saturn Compatible Packet Over Sonet Interface Specification for Physical Layer Devices (Level 2)." Issue 5. Canada: PMC-Sierra, Inc., Dec. 1998. (41 Pages).
"Serial-MII Specification." Revision 2.1. Cisco Systems, Inc., Feb. 2000. (7 Pages).
The ATM Forum Technical Committee. "Utopia Level 2, Version 1.0." Jun. 1995. (69 Pages).

* cited by examiner

*Primary Examiner* — Brian Roberts
(74) *Attorney, Agent, or Firm* — Eschweller & Associates, LLC

(57) ABSTRACT

An interface is proposed to couple a network processing device and at least one data pump device. The interface is of a serial type and is operable to transfer data chunks of a predetermined data chunk format comprising a channel address field indicating a logical channel the data chunk is assigned to.

41 Claims, 5 Drawing Sheets

LINE CARD WITH NETWORK PROCESSING DEVICE AND DATA PUMP DEVICE

FIELD

The present invention generally relates to a network processing device to be connected to at least one data pump device having at least one communication port, to a corresponding data pump device, and to a corresponding method of interfacing the network processing device and the data pump device.

BACKGROUND

In today's DSLAM arrangements, it is known to use line cards for providing a data connection between a backbone interface of a communication network and a plurality of physical communication ports associated with the individual subscriber connections. As used herein, a communication port is a circuit structure for receiving and/or transmitting data signals with respect to a communication medium, e.g. a twisted pair line. Coming from a public network side, a data path is distributed from a single backbone interface via a network processing chip to a plurality of data pump chips. Each of the data pump chips provides a number of communication ports to establish the connection to the subscriber. The network processing chip thus has a function of aggregating data signals with respect to a plurality of communication ports and may thus also be referred to as aggregator device.

SUMMARY

A network communication arrangement is disclosed herein according to at least one embodiment of the invention. The network communication arrangement comprises a network processing device and at least one data pump device. The at least one data pump device comprises at least one communication port. The network processing device and the at least one data pump device are coupled via an interface of a serial type. The interface is operable to transfer data chunks of a predetermined data chunk format. The data chunk format comprises a channel address field configured to indicate a logical channel the data chunk is assigned to.

The above described features and advantages, as well as others, will become more readily apparent to those of ordinary skill in the art by reference to the following detailed description and accompanying drawings.

DETAILED DESCRIPTION

Figure 1:
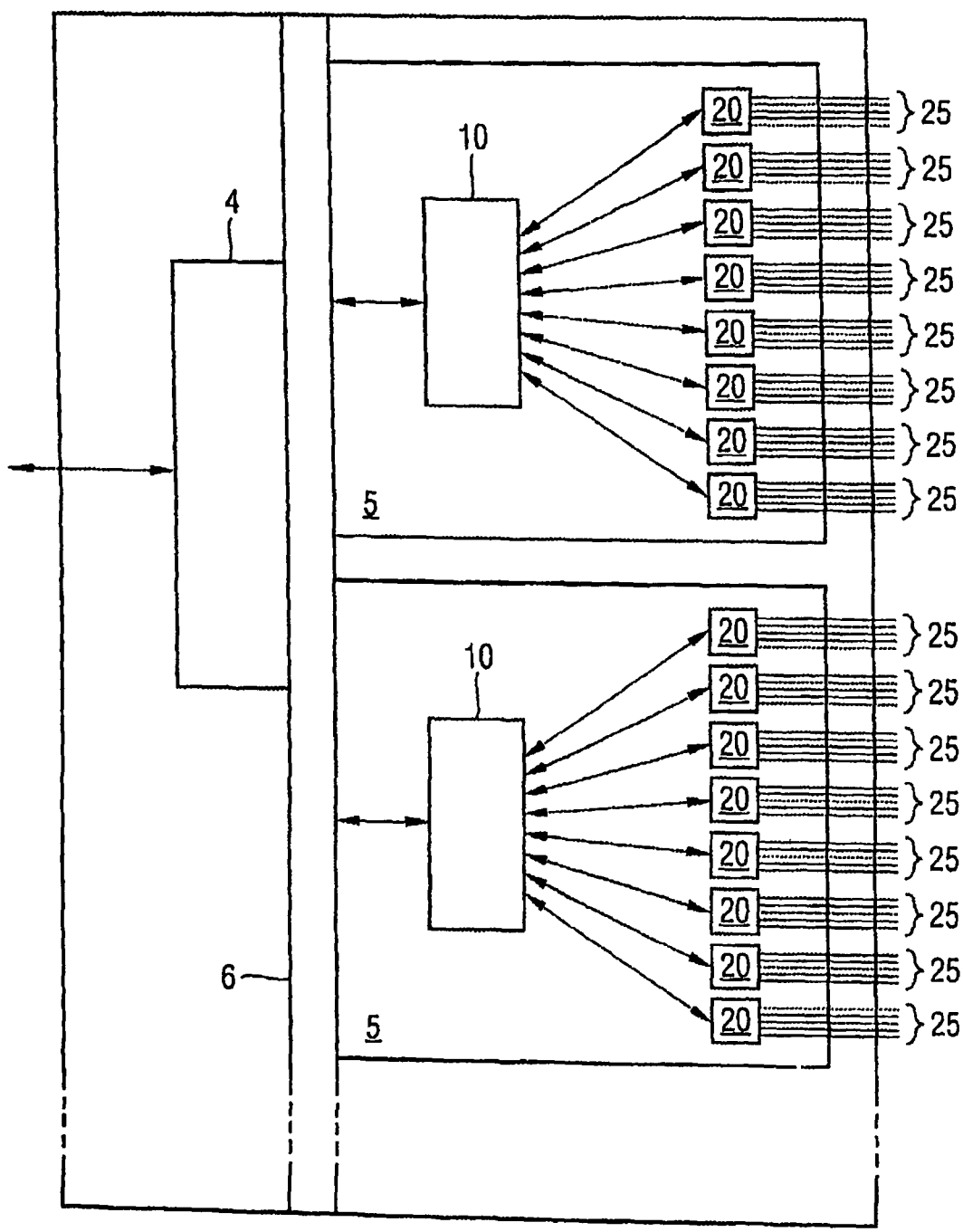
FIG. 1 is a schematic representation of a digital subscriber line access multiplexer comprising a plurality of line cards each having a network processing chip and a plurality of data pump chips.

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described hereinafter.

It is to be understood that in the following detailed description of exemplary embodiments any shown or described direct connection or coupling between two functional blocks, devices, components, or other physical or functional units could also be implemented by indirect connection or coupling.

In the following, embodiments of the invention will be described with reference to the accompanying drawings. The embodiments described hereinafter relate to a communication arrangement as typically present in a central office equipment for providing digital communication links of the digital subscriber line type (DSL type). In particular, the described communication arrangements may be located on a line card in a digital subscriber line access multiplexer (DSLAM). However, the described interface concepts may also be used in other network environments.

According to at least one embodiment, the present invention provides interfacing of a network processing device or aggregator device and a data pump device, based on an interface of a serial type allowing for a plurality of logical channels on a single physical link. The interface is configured to transfer, i.e. transmit and/or receive, data chunks having a predetermined or predefined data chunk format. The data chunk format comprises a channel address field to indicate the logical channel the data chunk is assigned to. The data chunk format may further comprise a payload field to include at least a portion of payload data. In some embodiments, the payload field may be omitted. Further, the payload field may be an optional field which can be omitted for some of the data chunks.

According to an embodiment, the interface is configured according to a master/slave configuration, the transmitting side or data source having the master role, and the receiving side or data sink having the slave role. In an embodiment, the network processing device acts as a master device with respect to the transfer of data chunks to the data pump device, i.e. controls the flow of data chunks, and the data pump acts as a slave device, i.e. receives the flow of data chunks as controlled by the network processing device.

According to an embodiment, the interface is configured for a bidirectional transfer of data in both an upstream direction and a downstream direction. In this case, the data chunk format may further comprise a flow control field to include an information with respect to an utilization value at an originating point of the data chunk. This allows for the transmitting side to be provided with information on the utilization value at the receiving side by including the corresponding information into the data chunks transferred in the opposite direction. This information may be used to control the transmission of data chunks from the network processing device to the data pump device to prevent overloading of the data pump device. According to an embodiment, the information on the utilization value is specific with respect to each logical channel. In this way, controlling the transmission of data chunks can be accomplished individually for each of the logical channels.

According to an embodiment, the bidirectional interface is implemented with a single data signal terminal for the downstream direction, a single data signal terminal for the upstream direction, a clock signal terminal for the downstream direction, a clock signal terminal for the upstream direction, a synchronization signal terminal for the downstream direction, and a synchronization signal terminal for the upstream direction. If the network processing device is connected to multiple data pump devices, the clock signal terminals and the synchronization signal terminals of the network processing device may be shared by the data pump devices, whereas the data signal terminals are provided on a point-to-point basis between the network processing device and each of the data pump devices.

According to an embodiment, the bidirectional interface is implemented with two differential data signal terminals for the downstream direction and two differential data signal terminals for the upstream direction. In this case, the data transfer may be accomplished without using dedicated clock or synchronization signals. Rather, a clock signal may be used which is embedded into the data signal, and a clock recovery unit may be provided to extract the embedded clock signal from a received data signal.

According to an embodiment, payload data is transferred in a sequence of data chunks. That is to say, depending on the size of the payload data, it may be included into a single data chunk or it may be segmented into a plurality of data chunks. According to an embodiment, the size of the payload field in the data chunks is limited to a fixed maximum value. In an embodiment, the payload fields of the first data chunks of a sequence may have the fixed maximum size, and the last data chunk of the sequence which may have a size smaller than the maximum size.

According to an embodiment, the data chunk format may comprise a sequence synchronization field to include an information on the position of the data chunk in the sequence. In particular, the sequence synchronization field may indicate that a data chunk constitutes the last data chunk in the sequence and thereby provide for a delineation between different payload data units.

According to an embodiment, the fixed maximum size of the payload field may be selected in such a way that a data cell according to the asynchronous transfer mode (ATM) can be included into a single data chunk, e.g. a maximum size of 64 bytes may be selected for the payload field.

According to an embodiment, the network processing device comprises at least one interface of the serial type as described above. According to an embodiment, the data pump device comprises at least one interface of the serial type as described above. The data pump device may provide a single physical communication port or a plurality of physical communications ports. In the latter case, at least one logical channel of the interface may be assigned to each of the physical communication ports.

According to an embodiment, the data pump device may also comprise a first bidirectional interface of the above-mentioned serial type and a second bidirectional interface of the above-mentioned serial type, the first interface being configured to retransmit data received via the second interface and the second interface being configured to retransmit data received via the first interface. This structure allows for arranging multiple data pump devices in a chain configuration. In this way, multiple data pump devices can be connected to a single interface of the network processing device. In this structure, it is possible to address the individual data pump devices using the logical channels of the interface.

According to an embodiment, a network communication arrangement is provided, which comprises a network processing device of the above-mentioned type and at least one data pump device of the above-mentioned type. The network processing device and the data pump device are interfaced using the interface of the serial type as described above.

According to an embodiment, a method of interfacing a network processing device and a data pump device is provided. The method comprises providing a physical link between the network processing device and the data pump device via an interface of a serial type, defining a plurality of logical channels on the physical link, and transferring data chunks having the predefined data chunk format as described above.

In the above embodiments, the network processing device may be implemented on a single semiconductor chip. Similarly, the data pump device may be implemented on a single semiconductor chip. Accordingly, the network processing device and the data pump device may also be referred to as network processing chip and data pump chip, respectively. The communication ports provided by the data pump devices may correspond to DSL communication ports, e.g. ADSL2+ or VDSL2 ports.

In the following, more detailed explanations will be made with reference to the accompanying drawings.

FIG. 1 illustrates a central office equipment in the form of a DSLAM. The DSLAM connects a plurality of subscribers to a network backbone. For this purpose, the DSLAM comprises a plurality of line cards 5, each providing a plurality of physical communication ports 25. This is accomplished by providing the line cards 5 with a plurality of data pump chips 20, each of the data pump chips 20 providing a number of physical communication ports 25. It is to be understood that in the illustration of FIG. 1, the number of line cards 5, the number of data pump chips 20, and the number of communication ports 25 per data pump chip 20 is merely exemplary and that different numbers could be provided according to the specific requirements.

In a communication network, the DSLAM is generally located between the network and a number of individual subscribers. Therefore, the DSLAM has a distributing function. When coming from the network side, the distribution of data signals is as follows: The DSLAM is connected to the network via a network interface 4. In some cases, the network interface may also be referred to as a backbone interface. For example, an optical fiber connection may be used for this connection. The transfer of data may be accomplished according to the ATM specification or other suitable protocol. Via a backplane 6 having a plurality of corresponding connectors, the line cards 5 are connected to the network interface 4. On each of the line cards 5, a network processing chip 10 is provided, which is coupled to the network interface 4 via the backplane 6 so as to transmit and receive data with respect to the network. From the network processing chip 10 the data signals are distributed to the data pump chips 20. From the data pump chips 20, the data signals are distributed to the communication ports 25, which correspond to individual subscriber terminals. Herein, the direction from the network side to the subscriber side is referred to as the downstream direction, and the direction from the subscriber side to the network side is referred to as the upstream direction. As mentioned above, due to its signal aggregating function, the network processing chip 10 may also be referred to as aggregator device or aggregator chip.

In the following, embodiments of the invention will be described, which relate to the interface provided between the network processing chip 10 and the data pump chips 20.

According to an embodiment, the interface between the network processing chip 10 and the data pump chip 20 is of a serial type. For each transfer direction, the interface is configured to transfer one bit of data at a time. According to an embodiment, the interface includes a maximum of two data terminals per direction of the data transfer, i.e. a maximum of two data terminals for the downstream direction and a maximum of two data terminals for the upstream direction. Further, the interface provides for multiple logical channels on a single physical link. In an embodiment, the number of logical channels is 24. In other embodiments a smaller or a larger number of logical channels may be provided.

According to an embodiment, a specific transfer format is used. The transfer format involves transferring payload data in a sequence of data chunks having a predefined data chunk format. Depending on the type of transmission protocol used for the communication ports 25, the payload data may be an ATM cell or may be a data frame of arbitrary size, e.g. an Ethernet frame. Both ATM cells and Ethernet frames may also be referred to as payload units.

The payload data is transferred in a sequence of data chunks. That is to say, a payload data unit is included into a single data chunk or is segmented into a plurality of data chunks. The data chunks are sequentially transmitted via the interface.

Figure 2:
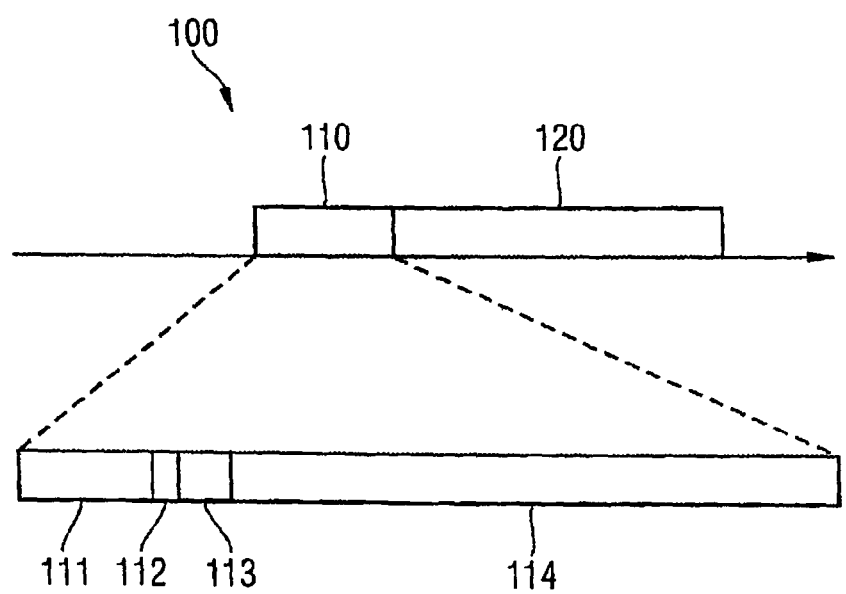
FIG. 2 schematically illustrates a data chunk format used in an interface according to an embodiment of the invention.

The data chunk format used by the interface will now be further described with reference to FIG. 2. In FIG. 2, an exemplary data chunk 100 is illustrated. The data chunk 100 comprises a control field 110 and an optional payload field 120. The control field 110 is pre-pended to the payload field 120. The payload field 120 includes at least a portion of payload data to be transmitted. According to an embodiment, the payload field 120 has a maximum size of 64 bytes, and the control field 110 has a size of 4 bytes. In other embodiments, the size and arrangement of the payload field 120 and of the control field 110 may be different.

The above-mentioned size of the payload field 120 allows for including payload data units in the form of an ATM cell into a single data chunk. Larger payload data units, in particular data frames having a length of more than 64 bytes, are segmented into a plurality of data chunks. In a sequence, the payload field 120 of the first data chunks will have the fixed maximum size as described above. In the last data chunk of a sequence, the payload field 120 may be shorter, as required to completely include the last portion of the payload data. By allowing a shorter length of payload field in the last data chunk, the efficiency of data transmission can be improved. In some cases, the payload field 120 may even be omitted.

As mentioned above, the interface provides for a plurality of logical channels on the same physical link. The data chunks are in each case assigned to one of the logical channels. At the receiving side, the payload data included in the data chunks can then be reassembled and further processed according to the logical channel from which it was received. In an embodiment, at least one logical channel is assigned to each communication port 25 of a data pump chip 20. Further, the interface allows for controlling the transmission of data chunks on the basis of an utilization value at the receiving side. According to the embodiment, these functionalities are obtained by means of a specific structure of the control field 110. The structure of the control field 110 is illustrated in the lower portion of FIG. 2.

As illustrated, the control field 110 comprises a channel address field 111, which specifies to which one of the logical channels the data chunk is assigned. According to an embodiment, the length of the channel address field 111 is five bits, thus allowing for distinguishing between 32 logical channels.

The control field 110 further comprises a sequence synchronization bit 112, which indicates whether the data chunk constitutes the last data chunk of a sequence or not. By means of the synchronization bit 112, reassembling of payload units from the data chunks is facilitated. On the basis of the synchronization bit, it can also be taken into account that the last data chunk of a sequence may actually comprise a payload field 120 which is smaller than the predefined maximum size of 64 bytes or that the payload field 120 was omitted in the data chunk.

Further, the control field 110 comprises a flow control field 114. The flow control field 114 includes information on a utilization value at an originating point of the data chunk, i.e. at the entity generating the data chunks. According to an embodiment, the flow control field comprises one bit for each of the logical channels. The bit is used to indicate a state when the fill level of a receiving buffer assigned to the logical channel has exceeded a predefined threshold. Accordingly, if data chunks are transmitted bidirectionally, i.e. if each interface comprises a transmitter and a receiver, the transmitter can evaluate the flow control fields of data chunks received in the opposite direction, determine whether a utilization value of the receiving buffer at the originating point of the data chunk has exceeded a predefined threshold, and correspondingly control the transmission of data chunks. Herein, this is referred to as backpressure mechanism, and the information in the flow control field 114, which contains one bit for each logical channel, is referred to as backpressure bitmap. According to an embodiment, the backpressure bitmap has a size of 24 bit, thereby supporting an individual flow control for 24 logical channels.

As further illustrated, the control field 110 also comprises a management field 113, which can be used to transmit management information.

According to the embodiment, suitable gaps are inserted between consecutive data chunks. The gaps may correspond to a length of one data byte.

It is to be understood that the illustrated order of the fields in the data chunk is merely exemplary, and that a different order may be used in other embodiments.

In the following, the backpressure mechanism will be further explained. According to an embodiment, the backpressure mechanism is used to control the flow of data packets between the network processing chip 10 and the data pump chips 20. This is desirable as the communication ports 25 of the data pump chips 20 have a limited throughput. In operation, it may therefore occur that a data pump chip 20 is not able to transmit data via one of the communication ports 25 at the same speed the data is received in the data pump chip via the corresponding logical channel of the serial interface. To some extent, this can be absorbed by the receiving buffer in the data pump chip 20. The backpressure mechanism allows for keeping the size of the receiving buffer in the data pump chip 20 at an acceptable level by using a flow control scheme based on the information included in the flow control field 114.

For each received logical channel of the interface, the data pump chips 20 provide a receiving buffer. The data pump chips 20 are provided with a flow monitoring unit which determines a utilization value of the receiving buffer for each logical channel received in the data pump chip 20. This is accomplished by comparing a fill level of the receiving buffer with a predetermined threshold, e.g. 75% of the maximum fill level. Corresponding to the results of the comparison, the flow monitoring unit generates the backpressure bitmap. In the backpressure bitmap, a set bit is used to indicate whether or not the fill level of the receiving buffer has exceeded the predetermined threshold. The backpressure bitmap is inserted into the flow control field 114 of data chunks transmitted from the data pump chip 20 to the network processing chip 10.

In the network processing chip 10, a flow control unit is provided which analyzes the flow control fields 114 of the data chunks received from the data pump chip 20. On the basis of the backpressure bitmap, the flow control unit determines whether the data pump chip 20 is able to handle new data chunks on a specific logical channel. If the backpressure bitmap indicates that the data pump chip 20 is not able to handle new data chunks on a specific logical channel, transmission of data chunks pertaining to this logical channel is interrupted until the backpressure bitmap received from the data pump chip 20 indicates that the data pump chip 20 is again able to handle data chunks on this logical channel. The control process may also involve interleaving data chunks of different logical channels.

As can be seen, the backpressure mechanism generally involves controlling the transmission of data chunks at a transmitter side on the basis of the backpressure bitmap which is transmitted back from the receiving side to the transmitting side. As the backpressure bitmap allows for including utilization information pertaining to a plurality of logical channels into a single data chunk, a very short latency is provided for the flow control. Accordingly, the sizes of the receiving buffers can be kept small. According to an embodiment, the size of the receiving buffers substantially corresponds to four data chunks. In other embodiments, the size of the receiving buffers may be even smaller.

In operation, a situation may occur that no payload data is to be transmitted in the upstream direction, i.e. from the data pump chip 20 to the network processing chip 10. According to an embodiment, the backpressure mechanism addresses this situation by generating "empty" data chunks, i.e. data chunks without a payload field, in the data pump chip 20, and including the backpressure bitmap into the flow control field 114 of the empty data chunks. The empty data chunks are transmitted to the network processing chip 10 and the flow control is carried out as described above. In this way, it is possible to maintain the flow control even in a situation when no data is transmitted in the upstream direction. As an alternative to empty data chunks, it is also conceivable to use "dummy" data chunks, in which the payload field 120 is filled with arbitrary data.

Although in the foregoing the backpressure mechanism was described for the transmission of data chunks from the network processing chip 10 to the data pump chip 20, it is also possible to implement the backpressure mechanism for the transmission of data chunks from the data pump chip 20 to the network processing chip 10. In this case, the flow monitoring unit and the flow control unit are provided in both the network processing chip 10 and the data pump chip 20.

In the following, examples of implementing the physical link between two interfaces of the above-mentioned type will be further described with reference to FIGS. 3-5.

Figure 3:
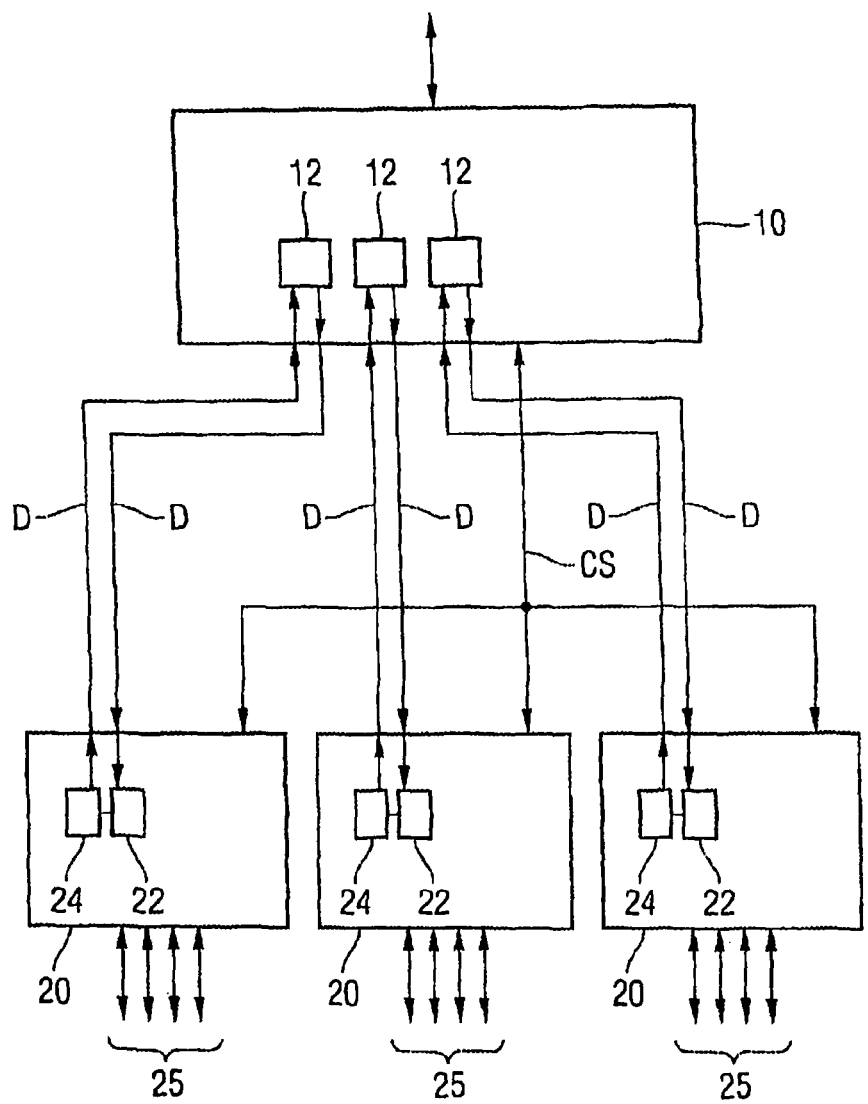
FIG. 3 schematically illustrates an interfacing arrangement between a network processing chip and a plurality of data pump chips according to an embodiment of the invention.

In FIG. 3, an exemplary communication arrangement is shown which comprises a network processing chip 10 and a plurality of data pump chips 20. In this arrangement, each data pump chip 20 is connected to the network processing chip by one serial point-to-point link. For each of the data pump chips 20, the network processing chip 10 comprises one interface. For each data pump chip 20, the interface comprises a single data signal terminal for the downstream direction and a single data signal terminal for the upstream direction. Data signals transferred via the data signal terminals are denoted with D. The interface further includes a clock signal terminal for the downstream direction, a clock signal terminal for the upstream direction, a synchronization signal terminal for the downstream direction, and a synchronization signal terminal for the upstream direction. The clock signal terminals and the synchronization signal terminals of the network processing chip 10 are shared between the data pump chips. Via the clock signal terminals, a clock signal is transmitted which allows for synchronizing sampling clocks of the network processing chip 10 and the data pump chip 20. Via the synchronization signal terminals, a synchronization signal is transmitted which allows for synchronizing the data transfer on the byte level. That is to say, the synchronization signal is used to indicate the beginning of a new byte transmitted via the data signal terminal. For the sake of clarity, the clock signals and the synchronization signals are illustrated as a single connection which is denoted by CS. According to an embodiment, the interfaces in the arrangement of FIG. 3 may be implemented as a special operating mode of an SMII Fast Ethernet interface.

The figure also schematically illustrates the flow control units 12 in the network processing chip 10, as well as the receiving buffers 22 and the flow monitoring units 24 in the data pump chips 20. Although this is not explicitly illustrated in the figure, it is to be understood that the network processing chip 10 and the data pump chips 20 may actually comprise further functional blocks. In particular, a functional block may be provided for segmenting payload data units into the sequence of data chunks, a functional block may be provided for reassembling payload data units from the sequences of data chunks, and a functional block may be provided for assigning the data chunks to a logical channel of the interface.

Figure 4:
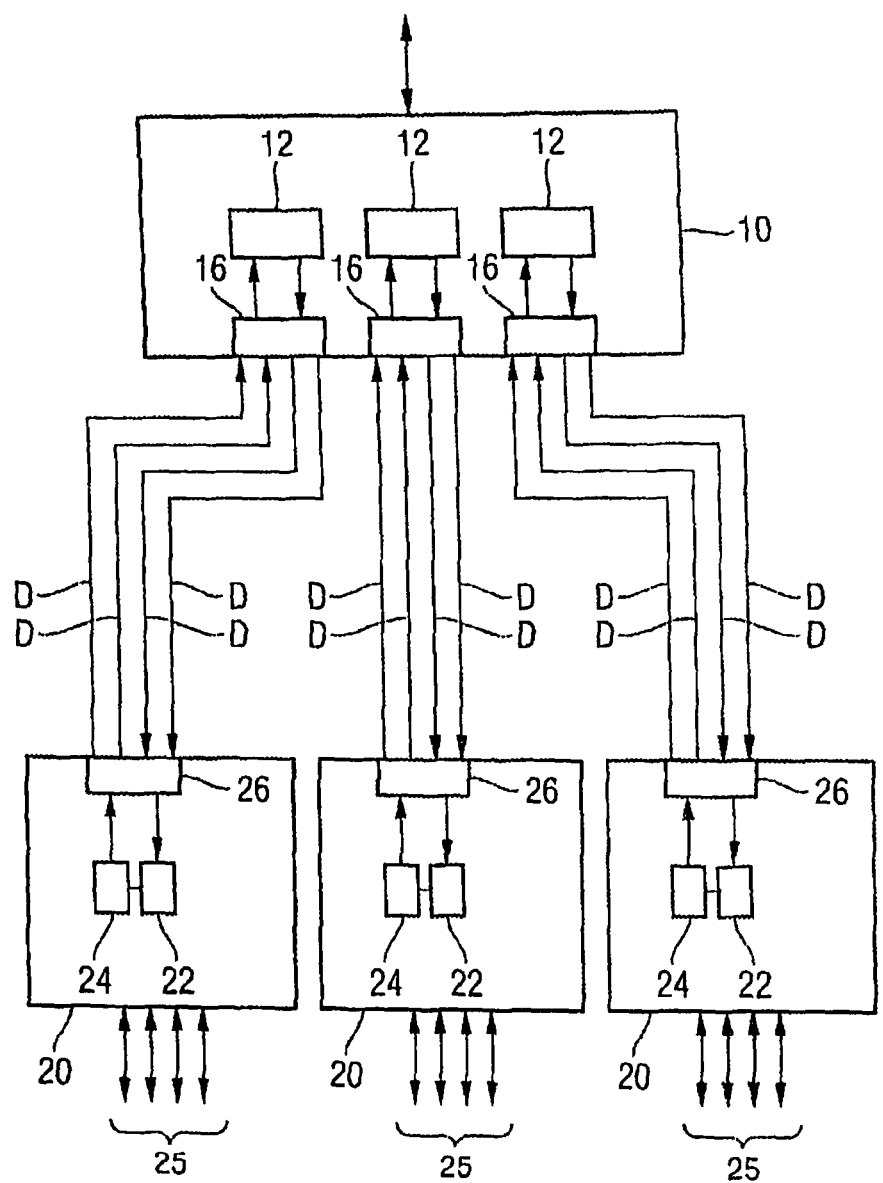
FIG. 4 schematically illustrates an interfacing arrangement between a network processing chip and a plurality of data pump devices according to a further embodiment of the invention.

In FIG. 4, an exemplary communication arrangement is shown which comprises a network processing chip 10 and data pump chips 20. In FIG. 4, components which are similar to those of FIG. 3 have been designated with the same reference signs, and in the following only the differences as compared to FIG. 3 will be explained.

For each of the data pump chips 20, the network processing chip 10 comprises one interface. The interfaces each comprise two differential data signal terminals for the downstream direction and two differential data signal terminals for the upstream direction. As compared to the communication arrangement of FIG. 3, no clock signal terminals and no synchronization signal terminals are provided. A synchronization of sampling clock signals between the network processing chip 10 and the data pump chips 20 is accomplished by using a clock signal which is embedded in the received data signals. For this purpose, the network processing chip 10 and the data pump chips 20 each comprise a clock recovery unit to extract the embedded clock signal from the received data signals. The clock recovery units are comprised in corresponding serializer/deserializer circuits 16, 26 which accomplish a suitable coding and decoding of the data signals D. In the network processing chip 10, a serializer/deserializer circuit 16 is provided for each of the interfaces.

According to an embodiment, the data chunks are provided at their beginning with a preamble which includes a specific synchronization pattern. In order to provide effective delineation between consecutive data chunks, a predefined gap between the data chunks is used.

According to an embodiment, an 8B/10B coding may be used for transferring the data chunks. Further, an interframe gap/preamble protocol as known from Gigabit Ethernet may be implemented. According to an embodiment, the interfaces in the arrangement of FIG. 4 may be implemented as a special operating mode of a Gigabit Ethernet interface.

Figure 5:
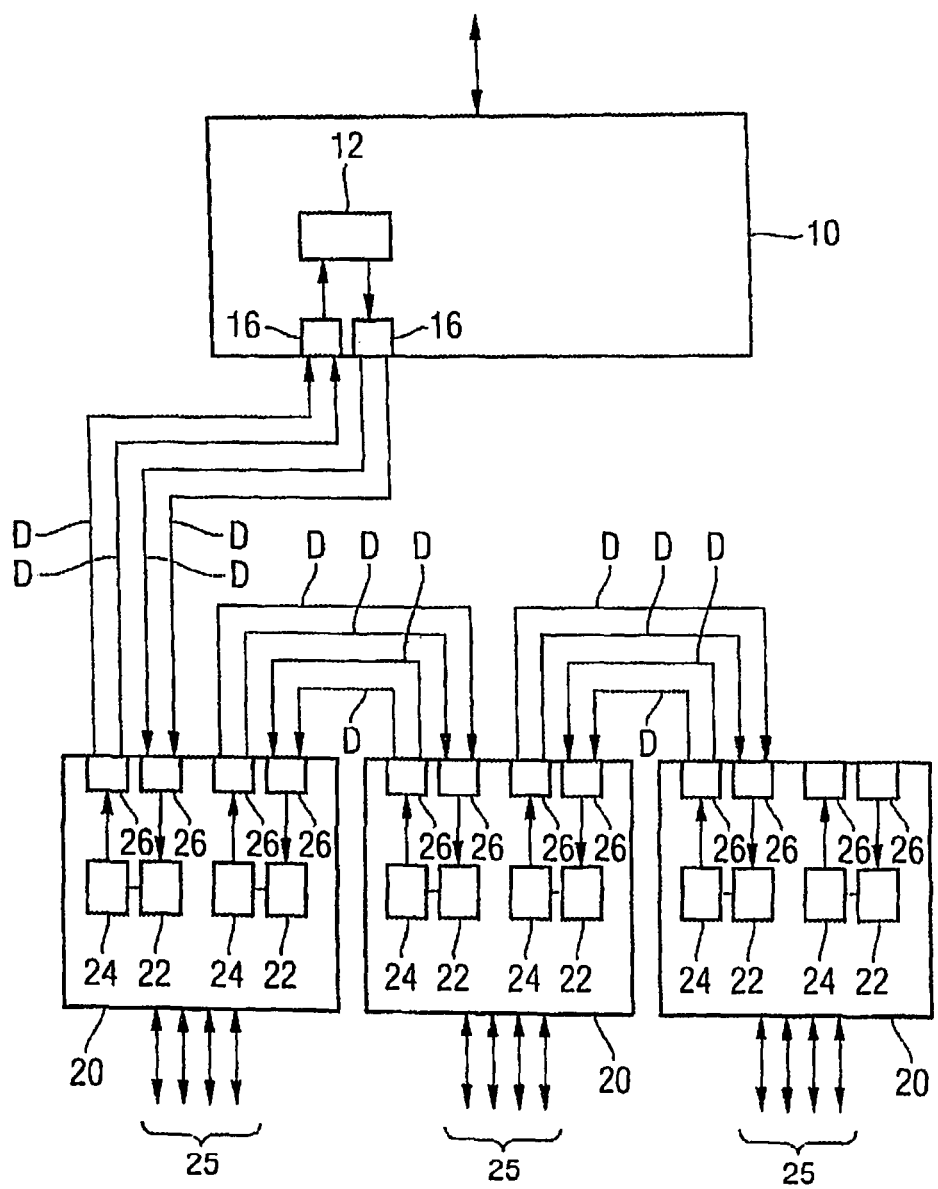
FIG. 5 schematically illustrates an interfacing arrangement between a network processing chip and a plurality of data pump chips according to a further embodiment of the invention.

FIG. 5 shows an exemplary communication arrangement including a network processing chip 10 and data pump chips 20. In this arrangement, a serial point-to-point link is provided between the network processing chip 10 and a first data pump chip 20 of a chain configuration, and the data pump chips 20 of the chain configuration are serially connected by serial point-to-point links. In FIG. 5, components which are similar to those of FIG. 4 have been designated with the same reference signs, and in the following only the differences as compared to FIG. 3 will be explained.

Generally, the interface used in this arrangement is similar to that used in the arrangement of FIG. 4. That is to say, the interface includes two differential data signal terminals for the downstream direction and two differential data signal terminals for the upstream direction. However, the network processing chip 10 does not include a dedicated interface for each of the data pump chips 20. Rather, a plurality of data pump chips 20 are coupled in the chain configuration, and one of the data pump chips 20, i.e. the first data pump chip 20 of the chain configuration, is coupled to the network processing chip 10. The communication between this data pump chip 20 and the network processing chip 10 is as explained for the arrangement of FIG. 4.

For coupling the data pump chips 20 in the chain configuration, each of the data pump chips 20 is provided with a further interface which is generally of the same type as that which is used for coupling the first data pump chip 20 of the chain configuration to the network processing chip 10. Accordingly, the data pump chips 20 each comprise a first interface to provide connection to the network processing chip 10 or to another data pump chip 20 located upstream from the data pump chip 20, and a second interface to provide connection to a further data pump chip 20 located downstream from the data pump chip 20. The first interface is configured to retransmit data received via the second interface and the second interface is configured to retransmit data received via the first interface. In this way, the data signals D can be transferred between each of the data pump chips 20 and the network processing chip 10.

In the arrangement of FIG. 5, addressing of the individual data pump chips 20 is accomplished by means of the logical channels provided by the interface. That is to say, at least one dedicated logical channel is assigned to each of the data pump chips 20. According to an embodiment, a number of dedicated logical channels is assigned to each data pump chip 20, which number corresponds to the number of communication ports provided by the data pump chip 20. For example, if each data pump chip 20 provides four communication ports, a dedicated group of four logical channels is assigned to each of the data pump chips 20. In the case of 24 logical channels and four communication ports per data pump chip 20, the number of data pump chips 20 which can be arranged in the chain configuration is thus six.

According to an embodiment, the arrangement of FIG. 5 also involves a special processing with respect to the backpressure bitmap which is inserted into the flow control field of the data chunks. The backpressure bitmap is individually generated in each of the data pump chips 20. As only a part of the logical channels is assigned to each of the data pump chips 20, the backpressure bitmap generated in the data pump chips 20 contains only information with respect to these logical channels. Therefore, each of the data pump chips 20 comprises a combination logic which combines the backpressure bitmap locally generated in the data pump chip 20 with the backpressure bitmap received from another data pump chip 20 and inserts the combined backpressure bitmap into the flow control field of the data chunk before retransmitting it. The combination may be based on a logical OR-combination of the locally generated backpressure bitmap with the received backpressure bitmap. In this way, it is possible that the network processing chip 10 receives a complete information on the utilization values in each of the data pump chips 20 with each received data chunk. According to an embodiment, the combination logic is included in the flow monitoring unit 24.

It is to be understood, that the above-explained exemplary configurations of communication arrangements are merely illustrative and can be modified and combined with each other as appropriate. For example, the number of data pump chips 20 and the number of communication ports provided by each of the data pump chips 20 can be suitably selected. Further, the number of interfaces of the network processing chip 10 and the data pump chips 20 could be increased, e.g. so as to provide two or more serial point-to-point links between the network processing chip 10 and the data pump chips 20 or between the data pump chips 20. Further, the configurations of FIGS. 4 and 5 can be combined with each other so as to obtain a configuration in which multiple chain configurations are connected to a single network processing chip 10. In this case, the network processing chip 10 would be provided with a single interface for each of the chain configurations. Also, it is to be understood that the last data pump chip 20 of a chain configuration may comprise a smaller number of interfaces, as no retransmission of data is required. Further, it is possible that the network processing chip 10 and/or the data pump chips 20 are provided with multiple interfaces of different types, e.g. an interface as described in connection with FIG. 3 and an interface as described in connection with FIG. 4 or 5.

In the above embodiments, the interfacing between the network processing chip and the data pump chip provides a low pin count of the network processing chip, thus allowing for a simplified circuit structure, in particular when a plurality of data pump chips is coupled to the network processing chip and/or a plurality of communication ports is provided by each of the data pump chips. Further, the described embodiments allow for controlling the data flow from the network processing chip to the data pump chips with a low latency and receiving buffer sizes in the data pump chips can be kept small. According to the described embodiments, a hardware handshake is not required for the interface. Therefore, the timing and layout of a communication arrangement on a printed circuit board, e.g. of a line card, can be simplified.

Although the foregoing embodiments of the invention have been described with respect to a DSLAM having a plurality of line cards, the invention is not limited thereto. For example, the concepts of the invention may also be applied to other types of central office equipment and to other networking systems. As another example, the concepts of the invention may be used with a variety of networking protocols. The communication ports provided by the data pump chips may correspond to any type of DSL communication port, for example ADSL2+ or VDSL2. However, it is also conceivable to use other types of communication ports.

Further, the described functionalities of the interface may be implemented in hardware, in software, or a combination thereof. Accordingly, the invention is also intended to cover software products, such as computer programs stored on a computer-readable medium, which allow existing interface hardware to operate according to the above-described concepts. Also, it is to be understood, that all the above embodiments can be combined with each other as appropriate.

What is claimed is:

1. A network processing device disposed on a line card and configured to provide a backbone interface of the line card, the network processing device comprising:
at least one interface of a serial type having a maximum of two data terminals per data transfer direction, each interface of said serial type being configured to provide connection to corresponding interfaces of said serial type of a plurality of data pump devices located on the same line card as the network processing device and each comprising at least one communication port of a digital subscriber line type, the at least one interface of said serial type defining multiple logical channels on a single physical link and the data pump devices being individually addressable by the logical channels,
wherein each interface of said serial type is operable to transfer data chunks of a predetermined data chunk format, the predetermined data chunk format comprising a channel address field configured to indicate a logical channel the data chunk is assigned to.

2. The network processing device of claim 1 wherein the data chunk format further comprises an optional payload field configured to include at least a portion of payload data.

3. The network processing device of claim 2 wherein the payload field of the data chunks has a predetermined maximum size.

4. The network processing device of claim 3 wherein the predetermined maximum size of the payload field is 64 bytes.

5. The network processing device of claim 1 wherein the at least one interface of said serial type provides for a bidirectional transfer of data in both an upstream direction and a downstream direction.

6. The network processing device of claim 5 wherein the data chunk format further comprises a flow control field configured to include information with respect to a utilization value at an originating point of the data chunk.

7. The network processing device of claim 6 wherein said information is specific with respect to each logical channel.

8. The network processing device according to claim 6 further comprising a flow controller configured to read the flow control field of a received data chunk and configured to control the transmission of data chunks according to the content of the flow control field.

9. The network processing device of claim 1 wherein the data chunk format further comprises a sequence synchronization field configured to include information on the position of the data chunk in a sequence of data chunks.

10. The network processing device of claim 1 wherein the at least one interface of a serial type comprises a plurality of interfaces of said serial type.

11. A data pump device configured to provide an interface of a line card to at least one subscriber, the data pump device comprising:
at least one communication port of a digital subscriber line type individually assigned to a corresponding subscriber; and
at least one interface of a serial type having a maximum of two data terminals per data transfer direction and being configured to provide connection to a corresponding interface of said serial type of a network processing device located on the same line card as the data pump device, the interface of said serial type defining multiple logical channels on a single physical link, the data pump device being individually addressable among a plurality of data pump devices by the logical channels,
wherein the at least one interface of said serial type is operable to transfer data chunks of a predetermined data chunk format, the data chunk format comprising a channel address field configured to indicate a logical channel the data chunk is assigned to.

12. The data pump device of claim 11 wherein the data chunk format further comprises an optional payload field configured to include at least a portion of payload data.

13. The data pump device of claim 12 wherein the payload field of the data chunks has a predetermined maximum size.

14. The data pump device of claim 13 wherein the predetermined maximum size is 64 bytes.

15. The data pump device of claim 11 wherein the at least one interface of said serial type provides for a bidirectional transfer of data in both an upstream direction and a downstream direction.

16. The data pump device of claim 15 wherein the data chunk format further comprises a flow control field configured to include information with respect to a utilization value at an originating point of the data chunk.

17. The data pump device of claim 16 wherein said information is specific with respect to each logical channel.

18. The data pump device according to claim 16 further comprising
a receiving buffer configured to store received data chunks, and
a flow monitor configured to determine a utilization value of the receiving buffer and to include corresponding utilization information into the flow control field of a transmitted data chunk.

19. The data pump device of claim 18 wherein a receiving buffer is provided for each logical channel received in the data pump device.

20. The data pump device of claim 11 wherein the data chunk format further comprises a sequence synchronization field configured to include information on the position of the data chunk in a sequence of data chunks.

21. The data pump device of claim 11, wherein the at least one interface of said serial type comprises a first interface of said serial type and a second interface of said serial type, wherein the first interface is operable to retransmit data received via the second interface and the second interface is operable to retransmit data received via the first interface.

22. The data pump device of claim 11 wherein the at least one communication port comprises a plurality of communication ports.

23. The data pump device of claim 22 wherein for each of the plurality of communication ports at least one logical channel is provided.

24. A line card comprising:
a network processing device positioned on the line card and configured to provide a backbone interface of the line card; and
a plurality of data pump devices positioned on the line card with the network processing device, configured to provide an interface of the line card to at least one subscriber, and each comprising a communication port of a digital subscriber line type individually assigned to a corresponding subscriber, wherein for connecting to each other the network processing device and the data pump devices each comprises an interface of a serial type having a maximum of two data terminals per data transfer direction, the interface of the serial type defining a plurality of logical channels over a single physical link and the data pump devices being individually addressable by the logical channels, wherein the interface of said serial type is operable to transfer data chunks of a predetermined data chunk format, the data chunk format comprising a channel address field configured to indicate a logical channel the data chunk is assigned to.

25. The line card of claim 24 wherein the data chunk format further comprises an optional payload field configured to include at least a portion of payload data.

26. The line card of claim 24 wherein the interface of said serial type provides for a bidirectional transfer of data in both an upstream direction and a downstream direction.

27. The line card of claim 26 wherein the data chunk format further comprises a flow control field configured to include information with respect to a utilization value at an originating point of the data chunk.

28. The line card of claim 27 wherein said information with respect to a utilization value is specific with respect to the logical channel.

29. The line card of claim 27 wherein the at least one data pump device comprises
a receiving buffer configured to store received data chunks, and
a flow monitor configured to determine a utilization value of the receiving buffer and to include a corresponding utilization information into the flow control field of a transmitted data chunk; and
wherein the network processing device comprises a flow controller configured to read the flow control field of a received data chunk and to control the transmission of data chunks to the data pump device according to the content of the flow control field.

30. The line card of claim 24 wherein the data chunk format further comprises a sequence synchronization field configured to include information on the position of the data chunk in a sequence of data chunks.

31. The line card of claim 24,
wherein the one of the data pump devices comprises a first and a second interface of said serial type,
wherein the data pump device is coupled to the network processing device via the first interface of said serial type and is coupled to a further one of the data pump devices via the second interface of said serial type,
wherein the first interface of said serial type is operable to retransmit data received via the second interface of said serial type and the second interface of said serial type is operable to retransmit data received via the first interface of said serial type.

32. A method of interfacing a network processing device and a plurality of data pump devices of a line card, the network processing device being configured to provide a backbone interface of the line card and the data pump devices being configured to provide an interface of the line card with respect to at least one subscriber through at least one communication port of a digital subscriber line type on each of the data pump devices, the method comprising:
on each of the network processing device and the data pump devices, providing an interface of a serial type having a maximum of two data terminals per data transfer direction;
via the interfaces of said serial type, providing a physical link between the network processing device and the data pump devices;
defining a plurality of logical channels on the physical link, the data pump devices being individually addressable by the logical channels; and
transferring data chunks of a predetermined data chunk format, the data chunk format comprising a channel address field configured to indicate the logical channel the data chunk is assigned to.

33. The method of claim 32 wherein the data chunk format further comprises an optional payload field configured to include at least a portion of payload data.

34. The method of claim 32 wherein the interface provides for a bidirectional transfer of data in both an upstream direction and a downstream direction.

35. The method of claim 34 wherein the data chunk format further comprises a flow control field configured to include information with respect to a utilization value at an origination point of the data chunk.

36. The method of claim 35 wherein said information is specific with respect to each logical channel.

37. The method of claim 35 further comprising:
providing a receiving buffer of each data pump device to store received data chunks;
determining a utilization value of the receiving buffer;
including corresponding utilization information into the flow control field of a data chunk transmitted from the at least one data pump device to the network processing device;
receiving the data chunk in the network processing device;
reading the flow control field of the received data chunk; and
controlling the transmission of data chunks from the network processing device to the at least one data pump device according to the content of the flow control field.

38. The method of claim 37 further comprising:
providing a receiving buffer for each of the logical channels received in each of the data pump devices;
determining utilization values for each of the receiving buffers; and
including utilization information corresponding to each of the receiving buffers into the flow control field of a transmitted data chunk.

39. The method of claim 38 wherein the utilization information has the form of a bitmap having a corresponding bit for each logical channel of the interface.

40. The method of claim 32 wherein the data chunk format further comprises a sequence synchronization field configured to contain information on the position of the data chunk in a sequence of data chunks.

41. The method of claim 32 further comprising segmenting a payload data unit to be transferred via the interface into a sequence of data chunks having said predetermined data chunk format.

* * * * *